UNITED STATES PATENT OFFICE.

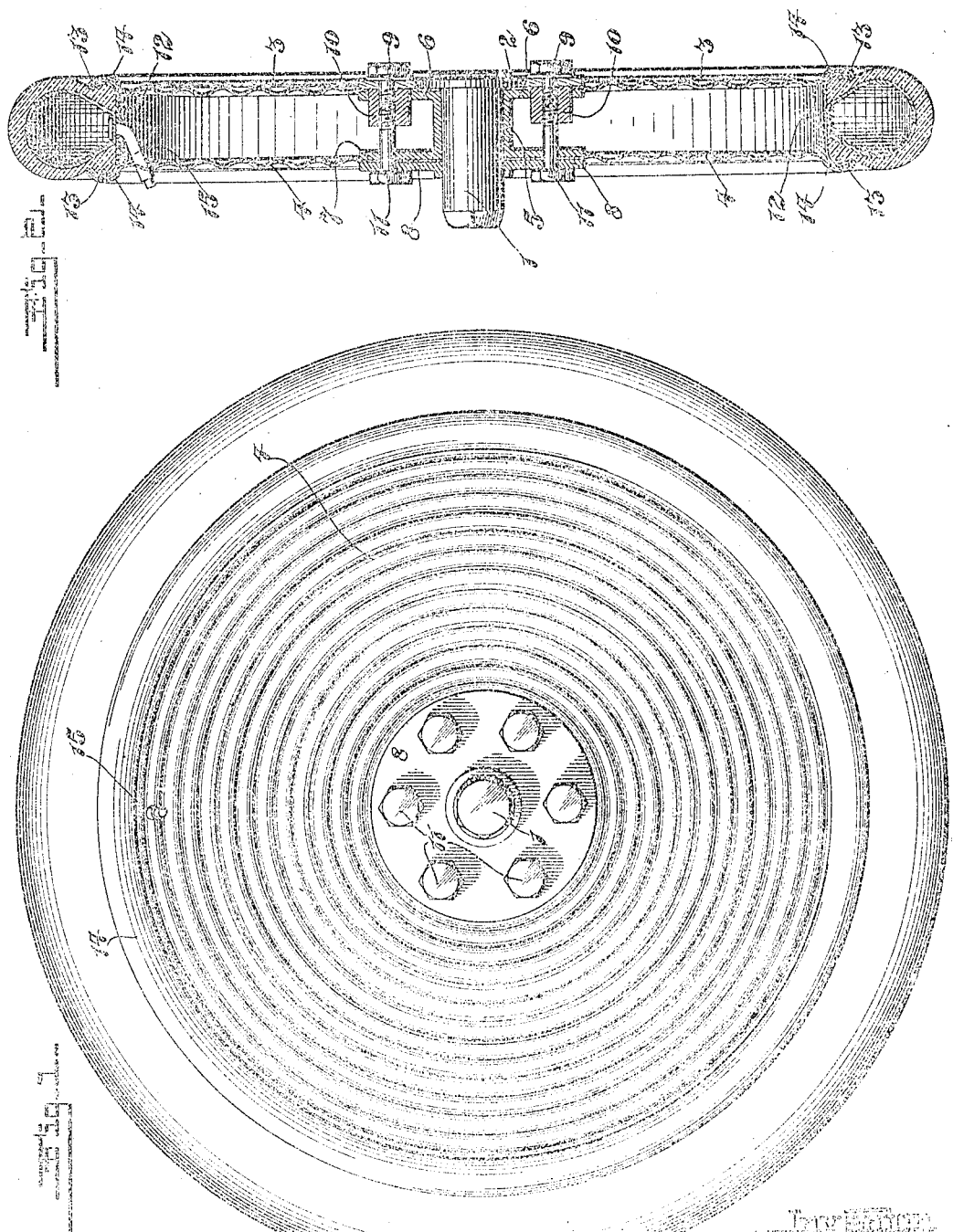

BRONSON BAYLISS, OF ST. LOUIS, MISSOURI.

WHEEL.

1,291,727.

Specification of Letters Patent.

Patented Jan. 21, 1919.

Application filed February 1, 1918. Serial No. 214,826.

*To all whom it may concern:*

Be it known that I, BRONSON BAYLISS, a citizen of the United States, residing at the city of St. Louis and State of Missouri, have invented a new and useful Wheel, of which the following is a specification.

This invention relates to wheels.

The object of the invention is to provide a demountable wheel of strong, durable and inexpensive construction and including disks preferably composed of sheet metal for supporting the tire in connection with the hub.

Other objects will appear from the following description, reference being made to the accompanying drawings, in which:—

Figure 1 is a side elevation of a wheel constructed in accordance with my invention.

Fig. 2 is a sectional view of the wheel.

As illustrated my improved wheel structure is constructed upon a hub of a wheel of the well known "Ford" automobile, though it will be apparent that a hub of that specific type is not essential and that the invention may be combined with hubs of other types without departing from the scope of the invention. The hub of the Ford wheel illustrated includes the bearing portion 1 in which the axle is journaled and a flange 2 which is integral or rigid with the inner end of the hub. It is in combination with this hub that I have illustrated my present invention, the parts of which are demountable or detachable from their connection with the hub, so that the wheel may readily be taken apart for replacement or repair of any of the parts, or other purposes, and reassembled.

My improved wheel dispenses with the use of spokes and instead thereof employs an inner disk 3 and an outer disk 4, both composed preferably of sheet metal of proper quality and gage, and also preferably provided with annular corrugations whereby the strength of the disks is increased. The corrugations also provide for the desired resiliency or elasticity.

Each of the disks has a central opening receiving the hub 1, and the inner disk is pressed against the outer surface of the flange 2 by a spacer comprising a tubular portion 5 fitting upon the hub, a circumferential flange 6 at its inner end and a similar flange 7 at its outer end. The disk 3 is clamped between the flanges 2 and 6.

The outer disk 4 is held against the flange 7 by a clamping member 8 matching the flange 7.

The devices for clamping the several parts together comprise bolts 9 passing through holes in the flange 2, being screwed into threaded holes in members 10 which are seated in appropriate openings or recesses in the flange 6; and bolts 11 passing through holes in the member 8, the disk 4 and the flange 7 and engaging in threaded holes in the members 10. Thus the bolts 9 and 11 coöperating with the members 10, constitute releasable or detachable clamps for holding the various parts in assembled connection; and said bolts, being releasable or detachable, permit demounting of the wheel or detachment of any of the parts thereof with very little inconvenience.

The outer or peripheral portion of the wheel is composed of a metallic ring 12 bent or folded to provide at each edge thereof a circumferential flange composed of an inner wall 13 and an outer wall 14, the same being made by spaced portions of the folded sheet metal. The peripheral edge of the disk 3 is embraced between the walls 13 and 14 of the flange at the inner edge of the ring and the peripheral edge of the disk 4 is embraced between the walls 13 and 14 of the flange at the outer edge of the ring. In the process of construction, after the edges of the rings 3 and 4 have been properly placed between the walls 13 and 14 at the inner and outer edges of the ring 12 respectively, pressure is applied to the flanges of the ring in order to curve the flanges and the interposed edges of the disks 3 and 4 and to press the parts into rigid contact so that they will be held in proper connection even under conditions of hard or rough usage. The pressure applied to the flanges of the ring curves the edges of the flanges inwardly to form proper seats or clenchers for the pneumatic tire as will be readily understood by reference to Fig. 2, in which it will be observed that the beads on the tire engage within the grooves formed by the curving flanges on the ring.

The tire may be inflated through a valve controlled passage 15 which, as shown, extends through one of the wheel disks.

A wheel of this construction is simple, strong and durable and is not easily broken or damaged as are wheels employing spokes of the usual construction. The wheel is readily demountable or detachable, so that when any part becomes damaged or broken it may be removed, and replaced by another part. While I have illustrated my improved wheel built or erected upon a hub of the well known Ford automobile, it is perfectly apparent that the use of the improvements is not limited to hubs of that particular type.

What I claim and desire to secure by Letters Patent, is:—

A wheel composed of a hub; two disks connected to the hub; and a ring in connection with the outer portions of said disks comprising an annular portion between said disks holding the outer portions of the disks the same distance apart as the inner portions thereof, and a circumferential flange on each edge of said ring composed of an inner wall and an outer wall extending inwardly to the plane of the annular portion of said ring, said two walls being clamped against the inner and outer surfaces of said disks respectively, whereby said ring holds said disks from moving toward and away from each other, the edges of said disks and the walls of said flanges being curved inwardly whereby they will retain a tire in position around said ring.

BRONSON BAYLISS.